United States Patent
Hirata et al.

(10) Patent No.: US 12,504,346 B2
(45) Date of Patent: Dec. 23, 2025

(54) LEAK TEST CONDITION DESIGN METHOD, LEAK TEST CONDITION DESIGN DEVICE, LEAK TESTING METHOD, AND LEAK TESTING DEVICE

(71) Applicant: FUKUDA CO., LTD., Tokyo (JP)

(72) Inventors: Mao Hirata, Tokyo (JP); Akimitsu Tanabe, Tokyo (JP)

(73) Assignee: FUKUDA CO., LTD., Tokyo (JP)

( * ) Notice: Subject to any disclaimer, the term of this patent is extended or adjusted under 35 U.S.C. 154(b) by 290 days.

(21) Appl. No.: 18/269,365

(22) PCT Filed: Dec. 24, 2021

(86) PCT No.: PCT/JP2021/048421
§ 371 (c)(1),
(2) Date: Jun. 23, 2023

(87) PCT Pub. No.: WO2022/138971
PCT Pub. Date: Jun. 30, 2022

(65) Prior Publication Data
US 2024/0060849 A1    Feb. 22, 2024

(30) Foreign Application Priority Data
Dec. 25, 2020 (JP) ................ 2020-218039

(51) Int. Cl.
G01M 3/26 (2006.01)
G01M 3/20 (2006.01)

(52) U.S. Cl.
CPC ............. G01M 3/26 (2013.01); G01M 3/20 (2013.01)

(58) Field of Classification Search
CPC ........ G01M 3/26; G01M 3/2876; G01M 3/00; G01M 3/2815; G01M 3/3236;
(Continued)

(56) References Cited

U.S. PATENT DOCUMENTS

| | | | |
|---|---|---|---|
| 2008/0148819 A1 | 6/2008 | Sasaki et al. | |
| 2016/0178472 A1* | 6/2016 | Watanabe | G01M 3/202 73/40.7 |
| 2016/0313207 A1 | 10/2016 | Wang et al. | |

FOREIGN PATENT DOCUMENTS

| | | |
|---|---|---|
| CN | 103207050 A | 7/2013 |
| JP | H08-043242 A | 2/1996 |

(Continued)

OTHER PUBLICATIONS

PCT/ISA/210, "International Search Report for PCT International Application No. PCT/JP2021/048421," Mar. 8, 2022.

*Primary Examiner* — John E Breene
*Assistant Examiner* — Truong D Phan
(74) *Attorney, Agent, or Firm* — HAUPTMAN HAM, LLP

(57) ABSTRACT

A leak test condition design method includes obtaining an internal volume of a test piece and a remaining internal volume of a test piece capsule with the test piece loaded for a differential pressure based air leak test; determining a test air pressure to be applied into the test piece capsule when the differential pressure based air leak test is performed; determining bombing conditions of a helium leak test; obtaining a differential pressure value between a test piece and a master to be gained when the differential pressure based air leak test is performed and converting into an equivalent standard leak rate to derive a differential pressure conversion value; obtaining a helium leak rate of the test piece gained and converting into an equivalent standard leak rate to derive a helium leak rate conversion value; and displaying the derived differential pressure conversion value and helium leak rate conversion value.

16 Claims, 11 Drawing Sheets

(58) Field of Classification Search
CPC ............ G01M 3/3254; G01M 3/3272; G01M 3/3263; G01M 3/329; G01M 15/09; G01M 3/34; G01M 3/007; G01M 3/3209; G01M 3/20
USPC .................................... 73/49.2–49.3, 40, 52
See application file for complete search history.

(56) References Cited

FOREIGN PATENT DOCUMENTS

| | | | |
|---|---|---|---|
| JP | H10-232179 A | | 9/1998 |
| JP | 2002-206982 A | | 7/2002 |
| JP | 2007278914 A | * | 10/2007 |
| JP | 2008-157899 A | | 7/2008 |
| JP | 2009-121898 A | | 6/2009 |
| JP | 2010-169515 A | | 8/2010 |
| WO | 2015/056661 A1 | | 4/2015 |

* cited by examiner

LEAK TEST CONDITION DESIGN METHOD, LEAK TEST CONDITION DESIGN DEVICE, LEAK TESTING METHOD, AND LEAK TESTING DEVICE

RELATED APPLICATIONS

The present application is National Phase of International Application No. PCT/JP2021/048421 filed Dec. 24, 2021, and claims priority from Japanese Application No. 2020-218039, filed Dec. 25, 2020, the disclosure of which is hereby incorporated by reference herein in its entirety.

TECHNICAL FIELD

The present invention relates to a leak test technology for inspecting airtightness of a test specimen (test piece) to be inspected, and more particularly, to a design method and a design device for evaluating and/or determining test conditions before a leak test is performed. The present invention further relates to a leak testing method including executing such a design method and a leak testing device including a design device.

BACKGROUND ART

In the prior art, in a wide range of fields including such as small electronic devices such as crystal oscillators and micro electro mechanical systems (MEMS), pharmaceutical packaging, food packaging, or the like, various leak tests are performed to inspect the airtightness of a test piece having a closed space inside. In Japanese Industrial Standards (JIS), a leak having an equivalent standard leak rate of 1 Pa·cm³/s or more is defined as a large leak, and a leak having an equivalent standard leak rate of less than 1 Pa·cm³/s is defined as a minute leak. Specific test methods of a gross leak test for detecting a large leak (hereinafter, referred to as a gross leak) and a fine leak test for detecting a minute leak (hereinafter, referred to as fine leak) are described in the JIS and MIL standards. In many cases, for a test piece leak test, the gross leak test and the fine leak test are performed together (see, for example, Patent Documents 1 to 3).

As the gross leak test, a differential pressure based air leak test based on, for example, JIS Z2332: 2012 (leak testing method due to pressure change) is widely adopted. In the differential pressure based air leak test, a predetermined test air pressure is supplied to a test piece capsule containing a test piece to be inspected and a master capsule containing a master which is a test piece without leak, and the differential pressure of the internal pressure between these capsules is detected by a differential pressure sensor. The quality of the airtightness of the test piece is determined by the presence or absence of differential pressure detection or comparison between the detected differential pressure value and a preset determination value.

As the fine leak test, for example, the helium leak testing method described in JIS Z2331: 2006 is well known, and the immersion method (bombing method) based on Annex 7 is widely adopted. In a helium leak test by using the immersion method, a large number (for example, several hundred) of test pieces are loaded in a filling chamber, the filling chamber is filled with pressurized helium gas as a test gas, and bombing is performed for a predetermined bombing time (for example, 1 to 2 hours). After this, if there is a minute leak (leak hole) in the test piece, the helium gas that has entered the inner space of the test piece due to the bombing gradually leaks out, so that this is detected by the helium leak detector.

The equivalent standard leak rate is defined as the standard leak rate of a test specimen when air is used as the test gas (leak rate (Pa·cm³/s) under standard conditions of temperature 25° C. and pressure difference 100 kPa), in JIS C60068-2-17:2001. Further, following relational expressions (1) to (3) representing a relationship between the helium gas leak rate and the equivalent standard leak rate are described, in Annex D of JIS C60068-2-17:2001, Annex 7 of JIS Z2331: 2006, and 2.1.2.3 of MIL-STD-883 METHOD 1014.15, respectively.

$$R = LP/P_0(M_a/M)^{1/2}\{1-\exp[-L/VP_0(M_a/M)^{1/2}t_1]\}\exp[-L/VP_0)M_a/M)^{1/2}t_2], \quad \text{[Relational expression (1)]}$$

where R is a measured leak rate of helium gas (Pa·cm³/s), L is an equivalent standard leak rate (Pa·cm³/s), P is a soaking absolute pressure (Pa), $P_0$ is an atmospheric pressure (Pa), V is an internal free volume of a test item or enclosure (cm³), $M_a$ is a mass density of air (=1.29 g/L), M is a mass density of helium gas (=0.18 g/L), $t_1$ is a soaking time(s), and $t_2$ is a dwell time after pressure release (s).

$$Q_R = Q_{AIR}P_e/P_0\sqrt{M_{AIR}/M_{He}}[1-\exp(-Q_{AIR}t_1/VP_0\sqrt{M_{AIR}/M_{He}})]\times\exp(-Q_{AIR}t_2/VP_0\sqrt{M_{AIR}/M_{He}}), \quad \text{[Relational expression (2)]}$$

where QR is a measured helium leak rate (Pa·m³/s), $Q_{AIR}$ is a standard air-equivalent leak rate (Pa·m³/s), Pe is a pressurizing absolute pressure (Pa), $P_0$ is an atmospheric pressure (=1.0×10⁵ Pa), MAIR is a molecular weight of air (=29.0), $M_{He}$ is a molecular weight of helium (=4), $t_1$ is a $P_e$ pressurization time(s), $t_2$ is a dwell time after pressure release (s), and V is an internal free volume of a test specimen (m³).

$$R_1 = LP_E/P_0(M_A/M)^{1/2}\{1-\exp[-Lt_1/VP_0(M_A/M)^{1/2}]\}\exp[-Lt_2/VP_0(M_A/M)^{1/2}], \quad \text{[Relational expression (3)]}$$

where $R_1$ is a calculated reject limit maximum allowable leakage measurement in atm cm³/s He, L is a maximum allowable equivalent standard leak rate limit in atm cm³/s air, PE is a pressure of exposure in atmospheres absolute (atm), $P_0$ is an atmospheric pressure in atmosphere absolute (=1 atm), MA is a molecular weight of air in grams (28.96), M is a molecular weight of a tracer gas (He) in grams (4 amu's), $t_1$ is a time of exposure to PE in seconds, $t_2$ is a dwell time between release of pressure and leak detection in seconds, and V is an internal free volume of a device package cavity in cubic centimeters.

From these relational expressions, the amount of helium leak detected in the helium leak test can be converted into an equivalent standard leak rate.

For example, in Patent Document 4, the relationship between the helium leak amount and the equivalent standard leak rate created according to the expression (1) described in Annex D of JIS C60068-2-17 is shown graphically in FIG. 14, and it is possible to know a leak region that can be determined in the helium leak test, from this graph. Further, the results of a helium leak test performed under different test conditions can also be compared and evaluated on the same coordinate axis called the equivalent standard leak rate.

Further, in the leak testing device that measures the leakage of gas from a container-to-be-tested, it is known that the amount of gas leaking from the container-to-be-tested can be calculated based on the differential pressure generated between a reference container and the container-to-be-tested and the volume of the container-to-be-tested (for example, see Patent Document 5).

CITATION LIST

Patent Documents

Patent Document 1: Japanese Patent Application Laid-Open No. 2007-278914
Patent Document 2: Japanese Patent Application Laid-Open No. 2002-206982
Patent Document 3: Japanese Patent Application Laid-Open No. 2010-169515
Patent Document 4: Re-publication of PCT International Publication No. WO2015-056661
Patent Document 5: Japanese Patent Application Laid-Open No. 1996-043242

SUMMARY OF THE INVENTION

Problems to be Solved by the Invention

According to Patent Document 4, in a large leak larger than a detectable leak region graphically shown at an equivalent standard leak rate, helium leaks from a test piece taken out from a filling chamber after bombing, before the helium is detected by the helium leak detector, so that there arises a problem that measurement is not possible. When conducting a separate air leak test for gross leak inspection, it is preferable that the leak region detectable by the air leak test and the leak region detectable by the helium leak test partially overlap. However, there is a risk that a leak region (referred to as a dead zone in the present specification) that cannot be detected in any of the leak tests may occur between the leak regions that can be detected by the differential pressure based air leak test and the helium leak test.

Moreover, the gross leak tests described in the above-described JIS and MIL standards are all qualitative methods, and it is difficult to present the leak rate in the gross leak region with specific numerical values from these test results. Therefore, it was not possible to determine and evaluate the test result of the gross leak region by the air leak test and the test result of the fine leak by the helium leak test, according to the same criteria. Further, it was also difficult to clearly determine the presence or absence of the dead zone described above.

Therefore, the present invention has been made in view of the above-described problems in the prior art, and firstly, an object of the present invention is to provide a leak test condition design method and a leak test condition design device for implementing the method, capable of evenly determining and evaluating the test results of a differential pressure based air leak test and a helium leak test, which are performed on the test piece to be inspected, using the same basis and scale, thereby appropriately determining the test conditions for both leak tests in advance.

A further object of the present invention is to provide a leak test condition design method and device capable of appropriately determining the test conditions for both leak tests such that a dead zone does not occur between the leak regions detectable in the differential pressure based air leak test and the helium leak test, respectively.

Further, an object of the present invention is to provide a leak testing device including the leak test condition design device of the present invention.

Means for Solving the Problems

A leak test condition design method according to the present invention includes:

obtaining a volume of an sealed internal space of a test piece to be inspected;
obtaining a remaining volume of an internal space of a sealed container for the test piece when the test piece is loaded for a differential pressure based air leak test;
determining a test air pressure to be applied into the sealed container for the test piece with the test piece loaded and a sealed container for a master with a master loaded in the differential pressure based air leak test;
determining conditions of a bombing process for filling a filling chamber with the test piece loaded with helium gas in a helium leak test;
simulating the differential pressure based air leak test under the obtained volume of the sealed internal space of the test piece, the obtained remaining volume of the internal space of the sealed container for the test piece, and the determined test air pressure to obtain a differential pressure value between the test piece and the master, and converting the obtained differential pressure value into an equivalent standard leak rate to derive a differential pressure conversion value; and
simulating the helium leak test under the determined conditions of the bombing process to obtain a helium leak rate of the test piece and converting the obtained helium leak rate into an equivalent standard leak rate to derive a helium leak rate conversion value, wherein
the differential pressure conversion value and the helium leak rate conversion value are generated to be displayed on a same graph with the equivalent standard leak rate as a horizontal axis or a vertical axis.

In an embodiment, displaying the differential pressure conversion value and the helium leak rate conversion value on the same graph with the equivalent standard leak rate as the horizontal axis or the vertical axis is further included.

In another embodiment, judging whether or not the differential pressure conversion value and the helium leak rate conversion value displayed on the same graph with the equivalent standard leak rate as the horizontal axis or the vertical axis have a region or regions partially overlapping each other with respect to the equivalent standard leak rate is further included.

Further, in another embodiment, the determined test air pressure and/or the determined conditions of the bombing process are judged as appropriate or not, depending on whether or not the differential pressure conversion value and the helium leak rate conversion value generated to be displayed on the same graph with the equivalent standard leak rate as the horizontal axis or the vertical axis have a region or regions partially overlapping each other with respect to the equivalent standard leak rate.

In still another embodiment, repeating the steps of the obtaining the remaining volume of the internal space of the sealed container for the test piece and thereafter, in case the differential pressure conversion value and the helium leak rate conversion value are judged not having a partially overlapping region with respect to the equivalent standard leak rate is further included.

In an embodiment, in the step of converting the obtained differential pressure value to derive the differential pressure conversion value, the obtained differential pressure value between the test piece and the master is converted into an air leak amount for the determined test air pressure, and transforming the converted air leak amount into dimensions of a leak hole of the test piece, so that the differential pressure value is converted into the equivalent standard leak rate based on the transformed dimensions of the leak hole.

In another embodiment, the dimensions of the leak hole are a diameter and a length in a gas flow direction of the leak hole.

Further, in an embodiment, in the step of converting the obtained helium leak rate to derive a helium leak rate conversion value, the obtained helium leak rate is converted into an equivalent standard leak rate according to the relational expression (1) between the helium leak rate and the equivalent standard leak rate based on Annex D of JIS C60068-2-17:2001.

A leak test condition design device according to the present invention includes:
- a computing part configured to obtain a volume of an sealed internal space of a test piece to be inspected, and to obtain a remaining volume of an internal space of a sealed container for the test piece when the test piece is loaded for a differential pressure based air leak test;
- a first test condition setting part configured to determine a test air pressure to be applied into the sealed container for the test piece with the test piece loaded and a sealed container for a master with a master loaded in the differential pressure based air leak test;
- a second test condition setting part configured to determine conditions of a bombing process for filling a filling chamber with the test piece loaded with helium gas in a helium leak test;
- a first simulation processing part configured to simulate the differential pressure based air leak test under the obtained volume of the sealed internal space of the test piece, the obtained remaining volume of the internal space of the sealed container for the test piece, and the determined test air pressure to obtain a differential pressure value between the test piece and the master, and also configured to convert the obtained differential pressure value into an equivalent standard leak rate to derive a differential pressure conversion value;
- a second simulation processing part configured to simulate the helium leak test under the determined conditions of the bombing process to obtain a helium leak rate of the test piece, and also configured to convert the obtained helium leak rate into an equivalent standard leak rate to derive a helium leak rate conversion value; and
- a display unit configured to display the differential pressure conversion value obtained from the first simulation processing part and the helium leak rate conversion value obtained from the second simulation processing part, on a same graph with the equivalent standard leak rate as a horizontal axis or a vertical axis.

In an embodiment, a judging part configured to judge whether the differential pressure conversion value and the helium leak rate conversion value have a region or regions partially overlapping each other with respect to the equivalent standard leak rate or not, when these conversion values are displayed on the same graph is further included.

In another embodiment, a control part configured to control the computing part, the first test condition setting part, the second test condition setting part, the first simulation processing part, the second simulation processing part and the display unit is further included, so that a series of operations including obtaining the remaining volume of the internal space of the sealed container for the test piece by the computing part, determining the test air pressure by the first test condition setting part, determining the conditions of the bombing process by the second test condition setting part, deriving the differential pressure conversion value by the first simulation processing part, deriving the helium leak rate conversion value by the second simulation processing part, and displaying the differential pressure conversion value and the helium leak rate conversion value on the same graph by the display unit are performed, in case the judging part judges that the differential pressure conversion value and the helium leak rate conversion value do not have a partially overlapping region with respect to the equivalent standard leak rate when displayed on the same graph.

Further, in an embodiment, the first simulation processing part converts the differential pressure value between the test piece and the master to be obtained in the differential pressure based air leak test, into an air leak amount for the determined test air pressure, and transforms the converted air leak amount into dimensions of a leak hole of the test piece, to convert the differential pressure value into the equivalent standard leak rate based on the transformed dimensions of the leak hole, so as to derive the differential pressure conversion value.

In another embodiment, the dimensions of the leak hole are a diameter and a length in a gas flow direction of the leak hole.

Further, in another embodiment, the second simulation processing part converts the helium leak rate to be obtained in the helium leak test, into an equivalent standard leak rate according to the relational expression (1) between the helium leak rate and the equivalent standard leak rate based on Annex D of JIS C60068-2-17:2001, so as to derive a helium leak rate conversion value.

A leak testing method according to the present invention includes:
- performing the leak test condition design method of the present invention described above on the test piece to be inspected;
- performing a differential pressure based air leak test on the test piece; and
- performing a helium leak test through a helium bombing process on the test piece, wherein
- the differential pressure based air leak test and/or the helium leak test are performed based on the test air pressure and/or the conditions of the bombing process, said test air pressure and the conditions of the bombing process being determined in the leak test condition design method so that the differential pressure conversion value and the helium leak rate conversion value have a region or regions partially overlapping each other with respect to an equivalent standard leak rate, when these conversion values are displayed on a same graph with the equivalent standard leak rate as a horizontal axis or a vertical axis.

A leak testing device according to the present invention includes:
- the leak test condition design device according to the present invention described above;
- an air leak testing unit to execute a differential pressure based air leak test on a test piece to be inspected, based on the test air pressure determined by the first test condition setting part of the leak test condition design device; and
- a helium leak testing unit to execute a helium leak test through a helium bombing process on the test piece to be inspected, based on the conditions of the bombing process determined by the second test condition setting part of the leak test condition design device.

Advantageous Effect of the Invention

According to the leak test condition design method and device according to the present invention, before actually using the differential pressure based air leak test and the helium leak test in combination, a differential pressure value between the test piece and the master which is to be obtained when a predetermined test air pressure is applied in a differential pressure based air leak test and a helium leak rate of the test piece which is to be obtained when the helium leak test is performed under predetermined bombing conditions can be converted into the equivalent standard leak rates respectively, and the equivalent standard leak rates can be displayed on the same graph with the equivalent standard leak rates as the horizontal axis or vertical axis. Accordingly, the differential pressure and the helium leak rate which are originally expressed on different units can be compared to each other on the same coordinate axis on the same scale, so that it can be easily verified that a dead zone does not occur between the leak regions detectable in the differential pressure based air leak test and the helium leak test, and test conditions in which a dead zone does not occur can be easily determined. Further, threshold values for judging the quality of the test piece can be determined while comparing the differential pressure based air leak test and the helium leak test on the basis of the equivalent standard leak rate, and therefore in the actual test, the equivalent standard leak rates can be returned to the differential pressure and the helium leak rate respectively to judge the quality of the test piece.

MODE FOR CARRYING OUT THE INVENTION

The present invention will be described in more detail below, by way of preferred embodiments, with reference to the accompanying drawings.

Figure 1:
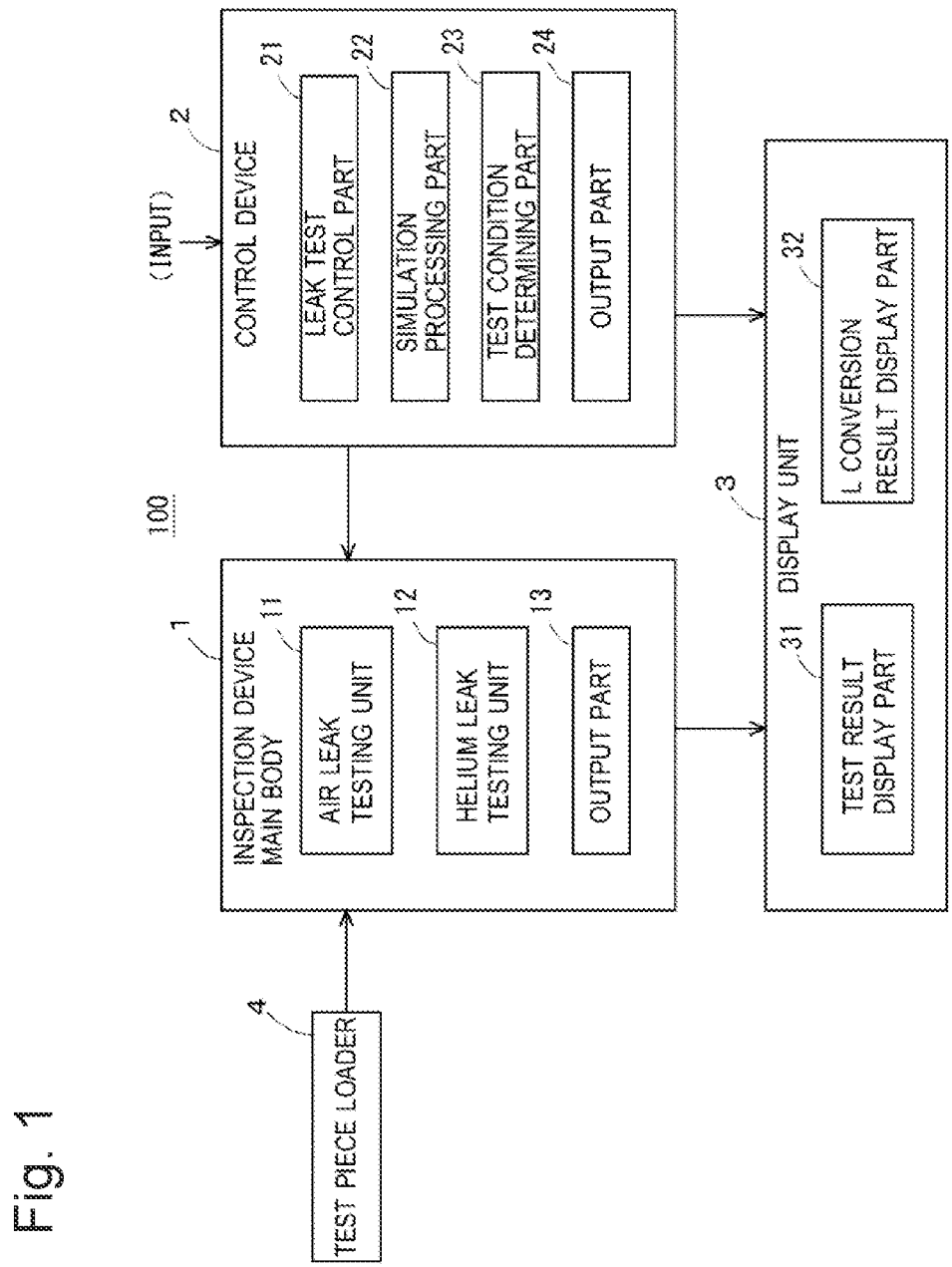
FIG. 1 is a block diagram schematically illustrating a structure of a leak testing device to implement an embodiment of a leak test condition design method according to the present invention.

FIG. 1 schematically illustrates a structure of a leak testing device to implement an embodiment of a leak test condition design method according to the present invention. The leak testing device 100 includes an inspection device main body 1, a control device 2, a display unit 3, and a test piece loader 4 that supplies the test piece to be inspected to the inspection device main body 1. Furthermore, the inspection device main body 1 can be connected to an external device such as a personal computer and/or to a printer as an external output means.

The inspection device main body 1 includes an air leak testing unit 11 and a helium leak testing unit 12. The inspection device main body 1 further includes an output part 13 that outputs test results of the air leak testing unit 11 and test results of the helium leak testing unit 12. The output part 13 outputs the test results to the display unit 3 and to an external device and/or system (not shown). Here, the external device and system include any device and system such as an external personal computer, a printer, a storage device, and a server that are connected to the output part 13 via various wired and/or wireless communication means.

The control device 2 includes a leak test control part 21 that controls execution of the air leak test by the air leak testing unit 11 and execution of the helium leak test by the helium leak testing unit 12 in the inspection device main body 1. The control device 2 further includes a simulation processing part 22 and a test condition determining part 23, in order to execute the leak test condition design method of the present embodiment. The control device 2 is provided with an output part 24 to be able to output result of a simulation process by the simulation processing part 22 and result of a test condition determination by the test condition determining part 23, as will be described later, to the display unit 3. Further, the result of the simulation process and the result of the test condition determination can be output via the output part 24 to an external personal computer, a printer, another external device and/or system.

The control device 2 includes a central processing unit (CPU), a read only memory (ROM), a random access memory (RAM), a storage device, and the like. The CPU controls the leak test control part 21, the simulation processing part 22, and the test condition determining part 23 while reading a program corresponding to a control procedure stored in the ROM. The storage device stores data necessary for the simulation process by the simulation processing part 22 and a process of the test condition determination by the test condition determining part 23, and the CPU controls the simulation process and the test condition determination process while referring to the data stored in the storage device based on the program etc.

The display unit 3 includes a test result display part 31 and an equivalent standard leak rate (L) conversion result display part 32. The test results of the air leak testing unit 11 and the helium leak testing unit 12 are output directly or via the control device 2, from the inspection device main body 1 to the test result display part 31, and displayed. The result of the simulation process and the result of the test condition determination are output from the control device 2 to the L conversion result display part 32 and are displayed thereon. The display unit 3 includes one or a plurality of display screens comprising, for example, a liquid crystal display (LCD). In one example, one display screen can be provided for each of the test result display part 31 and the L conversion result display part 32, or alternatively one display screen which is common to both the test result display part 31 and the L conversion result display part 32 can be provided.

Figure 2:
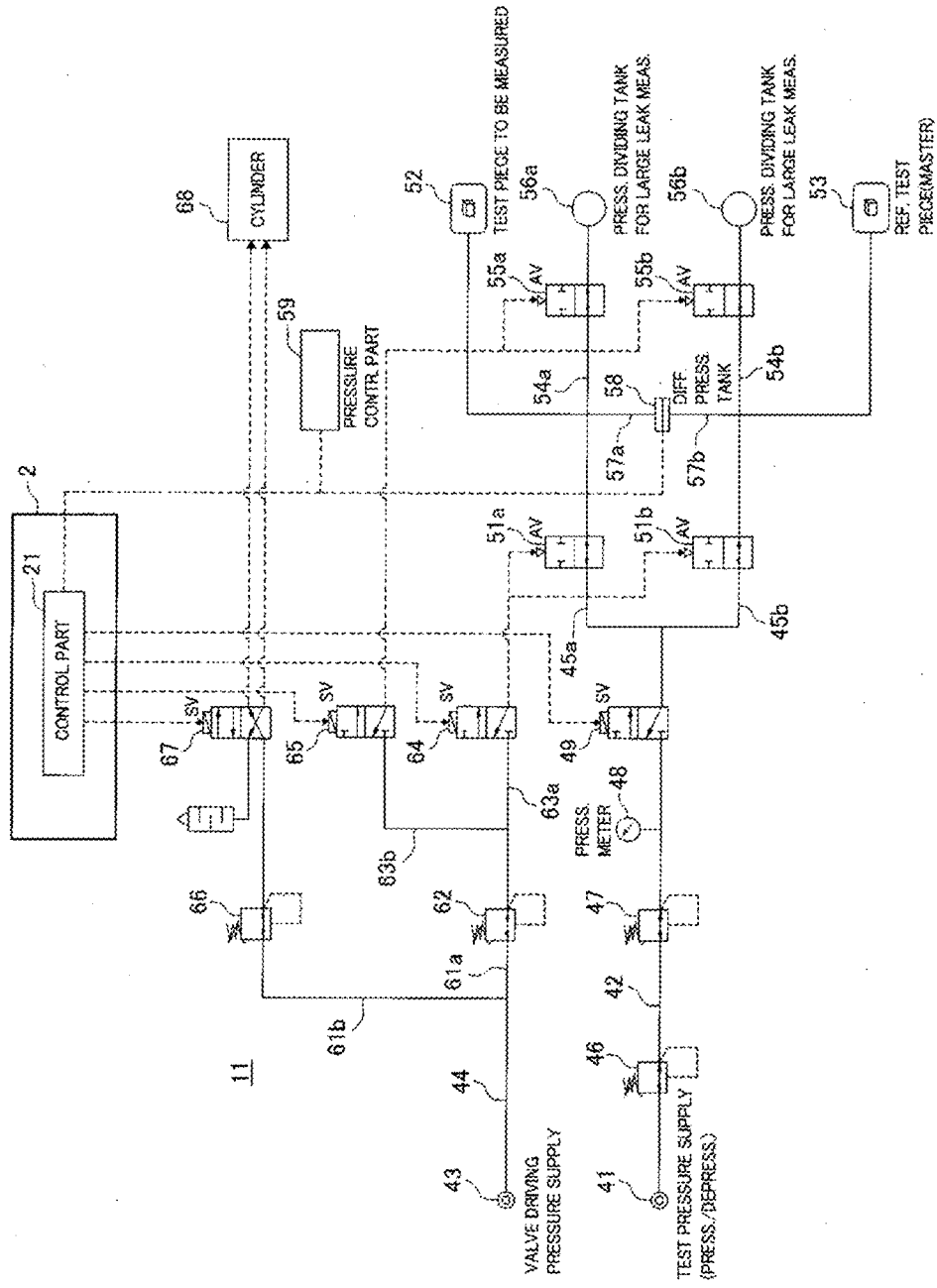
FIG. 2 illustrates a circuit configuration of an air leak testing unit in FIG. 1.

The air leak testing unit 11 includes a known differential pressure based air leak testing device, and FIG. 2 illustrates the preferred circuit structure thereof. The differential pressure based air leak testing device of FIG. 2 has a test pressure supply source 41 for supplying a test air pressure of a positive pressure or a negative pressure, and an air passage 42 therefor. The air passage 42 is provided with regulators 46 and 47, a pressure gauge 48, and an electromagnetic three-way valve 49 therealong from the upstream side thereof. The air passage 42 divides into a test piece-side branch passage 45a and a master-side branch passage 45b on the downstream side from the electromagnetic three-way valve 49.

The test piece-side branch passage 45a is provided with a normally open first on-off valve 51a, and is connected at a downstream end thereof to a test piece capsule 52 that is adapted to hermetically store the test piece therein. The master-side branch passage 45b is provided with a normally open first on-off valve 51b, and is connected at a downstream end thereof to a master capsule 53 that is adapted to hermetically store a master or a good non-leak test piece therein.

A differential pressure sensor 58 is provided between the test piece-side branch passage 45a and the master-side branch passage 45b, through and by means of introduction passages 57a and 57b being connected to the branch passages 45a and 45b on the downstream sides from the test piece-side first on-off valve 51a and the master-side first on-off valve 51b, respectively. The differential pressure sensor 58 is connected to the leak test control part 21 of the control device 2 so as to be able to output the differential pressure detected by the differential pressure sensor thereto, and is also connected to the pressure display part 59 so as to be able to display the differential pressure thereon.

The test piece-side branch passage 45a is connected with the auxiliary passage 54a between the first on-off valve 51a and the test piece capsule 52, and a normally open second on-off valve 55a is provided in midway of the auxiliary passage 54a, at the downstream end of which is connected a test piece-side pressure dividing tank 56a. The master-side branch passage 45b is connected with the auxiliary passage 54b between the first on-off valve 51b and the master capsule 53, and a normally open second on-off valve 55b is provided in midway of the auxiliary passage 54b, at the downstream end of which is connected a master-side pressure dividing tank 56b.

The control pressure dividing tanks 56a and 56b are used to discriminate and detect a "large leak" with a large leak amount and a "small leak" with a small leak amount, within a range of the gross leak region of leak measured by the gross leak test. When a differential pressure based air leak test is performed by the air leak testing unit 11, after a test air pressure is applied from the test pressure supply source 41 with the second on-off valves 55a and 55b being closed, the first on-off valves 51a and 51b are closed, and so a portion of the test piece-side branch passage 45a on the downstream side from the first on-off valve 51a and a portion of the master-side branch passage 45b on the downstream side from the first on-off valve 51b are turned into closed circuits respectively. In the closed circuit portion of the test piece-side branch passage 45a, when the test air pressure is a positive pressure, compressed air may slowly enter in a test piece loaded in the test piece capsule 52, if a defect of the test piece is a small leak. A minute pressure fluctuation generated thereby in the closed circuit portion of the test piece-side branch passage 45a can be detected by the differential pressure sensor 58 as a differential pressure with respect to the closed circuit portion of the master-side branch passage 45b.

On the other hand, if the defect of the test piece in the test piece capsule 52 is a large leak, the compressed air may enter in the test piece at once when the test air pressure is applied from the test pressure supply source 41, and so even after the first on-off valves 51a and 51b are closed, any such minute pressure fluctuation as described for the small leak will not occur in the closed circuit portion of the test piece-side branch passage 45a. As a result, a differential pressure is not generated between the closed circuit portion of the test piece-side branch passage 45a and the closed circuit portion of the master-side branch passage 45b, and the differential pressure sensor 58 does not respond, therefore a defect of the test piece cannot be detected. When the differential pressure sensor 58 does not respond in this manner, the second on-off valves 55a and 55b are opened, so that air in the closed circuit portions of the test piece-side branch passage 45a and the master-side branch passage 45b is divided into the respective pressure dividing tanks 56a and 56b, to reduce the pressures in the closed circuit portions. The pressure drop in the closed circuit portion of the test piece-side branch passage 45a due to the pressure dividing is smaller than that of the closed circuit portion of the master-side branch passage 45b, and thereby the pressure in the closed circuit portion of the test piece-side branch passage 45a becomes higher than the pressure in the closed circuit portion of the master-side branch passage 45b, and that pressure difference is detected by the differential pressure sensor 58, so that a large leakage of the test piece can be detected.

The air leak testing unit 11 is provided with a valve drive circuit for driving the first on-off valves 51a and 51b and the second on-off valves 55a and 55b. The valve drive circuit includes a valve drive pressure supply source 43 for supplying valve drive pressure to the first and second on-off valves 51a, 51b, 55a and 55b, and a drive pressure passage 44. The driving pressure passage 44 divides into a first branch passage 61a and a second branch passage 61b, and the first branch passage 61a is provided with a regulator 62 and on the downstream side thereof further divides into a first drive branch passage 63a and a second drive branch passage 63b.

An electromagnetic three-way valve 64 that opens and closes the first on-off valves 51a and 51b by the valve drive pressure applied from the valve drive pressure supply source 43 is provided at the downstream end of the first drive branch passage 63a. An electromagnetic three-way valve 65 that opens and closes the second on-off valves 55a and 55b by the valve drive pressure applied from the valve drive pressure supply source 43 is provided at the downstream end of the second drive branch passage 63b. The second branch passage 61b is provided with a regulator 66, and at the downstream end thereof is connected an electromagnetic three-way valve 67 to drive a cylinder 68.

Figure 3:
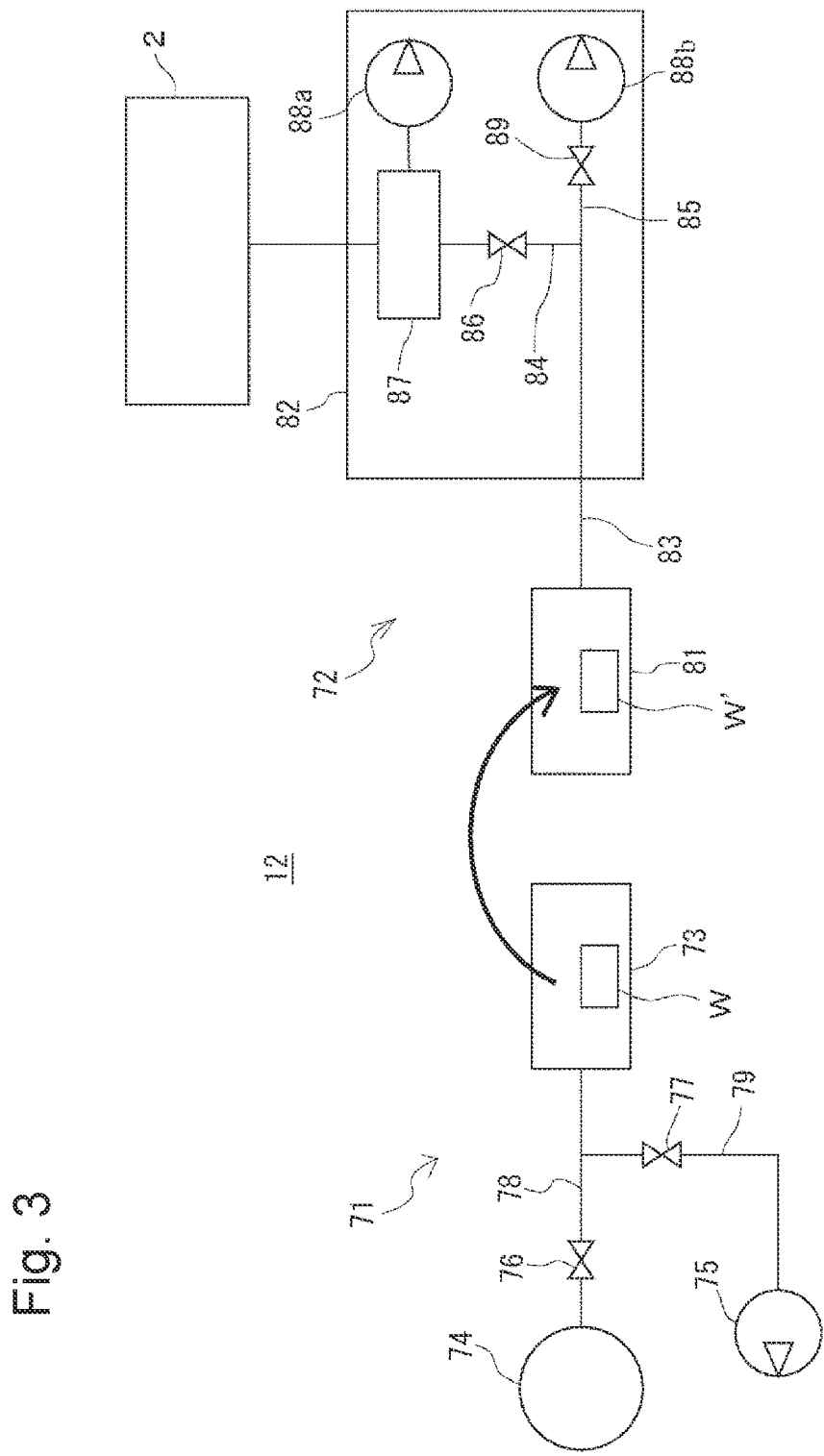
FIG. 3 illustrates a circuit configuration of a helium leak testing unit in FIG. 1.

The helium leak testing unit 12 includes a known helium leak testing device, and FIG. 3 illustrates the preferred circuit structure. The helium leak testing device of FIG. 3 includes a helium supply unit 71 and a leak inspection unit 72. The helium supply unit 71 includes a bombing tank 73, a helium supply source 74 (tracer gas supply source) comprising such as a helium cylinder, and a vacuum pump 75. The bombing tank 73 includes a sealable pressure container, in which the test piece to be inspected is loaded. The helium supply source 74 and the vacuum pump 75 are connected to the bombing tank 73 via passages 78 and 79, each of which is provided with on-off valves 76, 77 and regulators (not shown) respectively.

Transferring the test piece W from the bombing tank 73 to the examination capsule 81 can be performed in a short time, by using known automatic conveying means (not shown) for all processes including taking out the test piece W from the bombing tank 73, conveying the test piece W, and loading the test piece W in the examination capsule 81. Such automatic conveying means is described in, for example, Patent Document 3 described above. As a matter of course, it is also possible for the operator to manually take out the test piece W from the bombing tank 73, transport the test piece W, and load the test piece W in the examination capsule 81.

The leak inspection unit 72 includes the examination capsule 81, and a helium leak detector 82 (tracer gas detecting means). The examination capsule 81 is composed of a sealable vacuum container in which the test piece after bombing taken out from the bombing tank 73 is loaded. The examination capsule 81 is connected to the helium leak detector 82 via a pipeline 83.

The downstream side of the pipeline 83 is divided into a detection passage 84 and a suction passage 85 inside the helium leak detector 82. The detection passage 84 is provided with an on-off valve 86 and a helium detection unit 87 in order from the upstream side, and a vacuum pump 88a is connected at the downstream end thereof. The suction passage 85 is provided with an on-off valve 89, and a vacuum pump 88b is connected at the downstream end thereof. The on-off valve 86 and the on-off valve 89 are constructed to selectively open such that when one of them is open, the other is closed.

The helium detection unit 87 comprises, for example a mass analyzer, and detects helium (tracer gas) in a gas sucked from the examination capsule 81. The helium leak detector 82 is connected to the control device 2 to output a detection signal when the helium detection unit 87 detects helium.

According to the present invention, before the differential pressure based air leak test and the helium leak test are executed on the test piece by the inspection device main body 1 of the leak testing device 100, the leak test condition design method of the present embodiment is executed in the control device 2 to predict a measurable leak range of the differential pressure based air leak test and the helium leak test, and to determine the test conditions for both tests. Next, the leak test condition design method according to the present embodiment will be described with reference to the flowchart of FIG. 4.

First, the simulation processing part 22 of the control device 2 obtains the volume of the sealed internal space of the test piece (step S01). The volume of the sealed internal space (hereinafter, referred to as the test piece internal volume) is calculated, for example, from the internal dimensions described in the specifications of the test piece, or is directly obtained when the volume itself is described in the specification etc., or can be provided from the manufacturer or the provider of the test piece. The internal dimensions of the test piece can be input to the control device 2, for example, by an operator operating an input unit (not shown) of the control device 2 or by receiving a communication from an external device, and can be stored in the control device 2 in advance. Here, the test piece internal volume is referred, when the test piece is a small electronic component with a sealed package such as MEMS, as a remaining volume excluding volume of components such as devices mounted in the package from volume of the internal space of the package itself.

Figure 5:
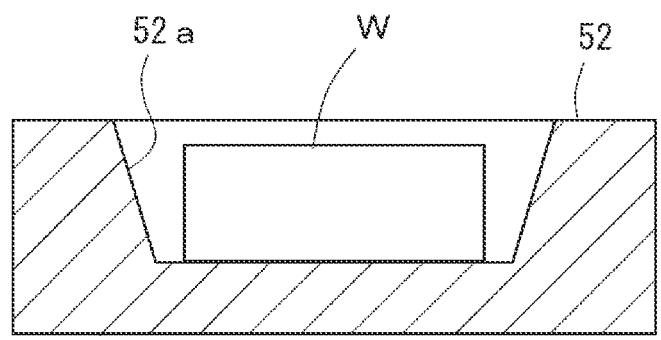
FIG. 5 schematically shows a cross-section of a test piece capsule with the test piece W loaded.

Next, the simulation processing part 22 obtains the remaining volume of the test piece capsule 52 with the test piece loaded therein (step S02). The remaining volume of the test piece capsule 52 is referred as the volume of the internal space 52a with the test piece W loaded therein, as illustrated in FIG. 5. The internal volume of the test piece capsule 52 (the volume of the inner space 52a) in an empty state is stored in the control device 2 in advance, and the remaining volume can be easily obtained by subtracting the volume (test piece outer volume) of the test piece W from the internal volume. Similarly as described with the test piece internal volume, the test piece outer volume can be obtained from descriptions of the specification etc., or from the manufacturer or provider of the test piece, or by receiving through the operator's operations or communication from the outside, or can be calculated from external dimensions thereof obtained in such a manner.

Furthermore, the simulation processing part 22 determines the test air pressure to be applied to the test piece capsule 52 with the test piece loaded in the differential pressure based air leak test (step S03). In determination of the test air pressure, a value considered to be optimum is selected based on data stored in the control device 2 in advance, in consideration of a withstand pressure of the test piece which is input to the control device 2 by the operator or provided from an external device.

Next, the conditions of helium bombing to be performed on the test piece in the helium leak test are determined (step S04). Here the determined bombing conditions include a bombing pressure to be applied to the bombing tank 73 in which the test piece is loaded, and a bombing time to maintain the bombing pressure. In determining the bombing pressure, similarly as described with the test air pressure, a value considered to be optimum is selected based on data stored in the control device 2 in advance, in consideration of the withstand pressure of the test piece.

The bombing time is determined such that a sufficient amount of helium that can be detected after bombing by the helium leak detector 82 enters in the test piece, in consideration of the test piece internal volume, the bombing pressure, and the size of a minute leak expected with the test piece. The simulation processing part 22 makes this determination based on the data stored in the control device 2 in advance.

In the helium leak test, it is important to manage the dwell time that elapses from taking the test piece out of the bombing tank 73 and after the bombing until loading in the examination capsule 81. As is well known to those skilled in the art, helium that enters in the test piece by the bombing is released to outside of the test piece from when helium filled under pressure in the bombing tank 73 starts to be discharged, and the release amount decreases over time. Here, the amount of helium that enters in the test piece depends on the volume of the sealed internal space of the test piece, the bombing pressure, the bombing time, and the size of the leak hole (for example, the diameter and the length in the gas flow direction).

Therefore, the amount of helium that is released from the test piece and detected after the bombing also decreases over time. The dwell time for which helium can be detected after bombing varies depending on the volume of the sealed internal space of the test piece, the bombing pressure, the bombing time, and the leak amount of helium released from the leak hole. The leak amount of helium released from the leak hole depends on the size of the leak hole (for example, the diameter and the length in the gas flow direction). According to the present embodiment, the leak amount of helium is converted to an equivalent standard leak rate defined in JIS, and is represented as such.

Figure 6:
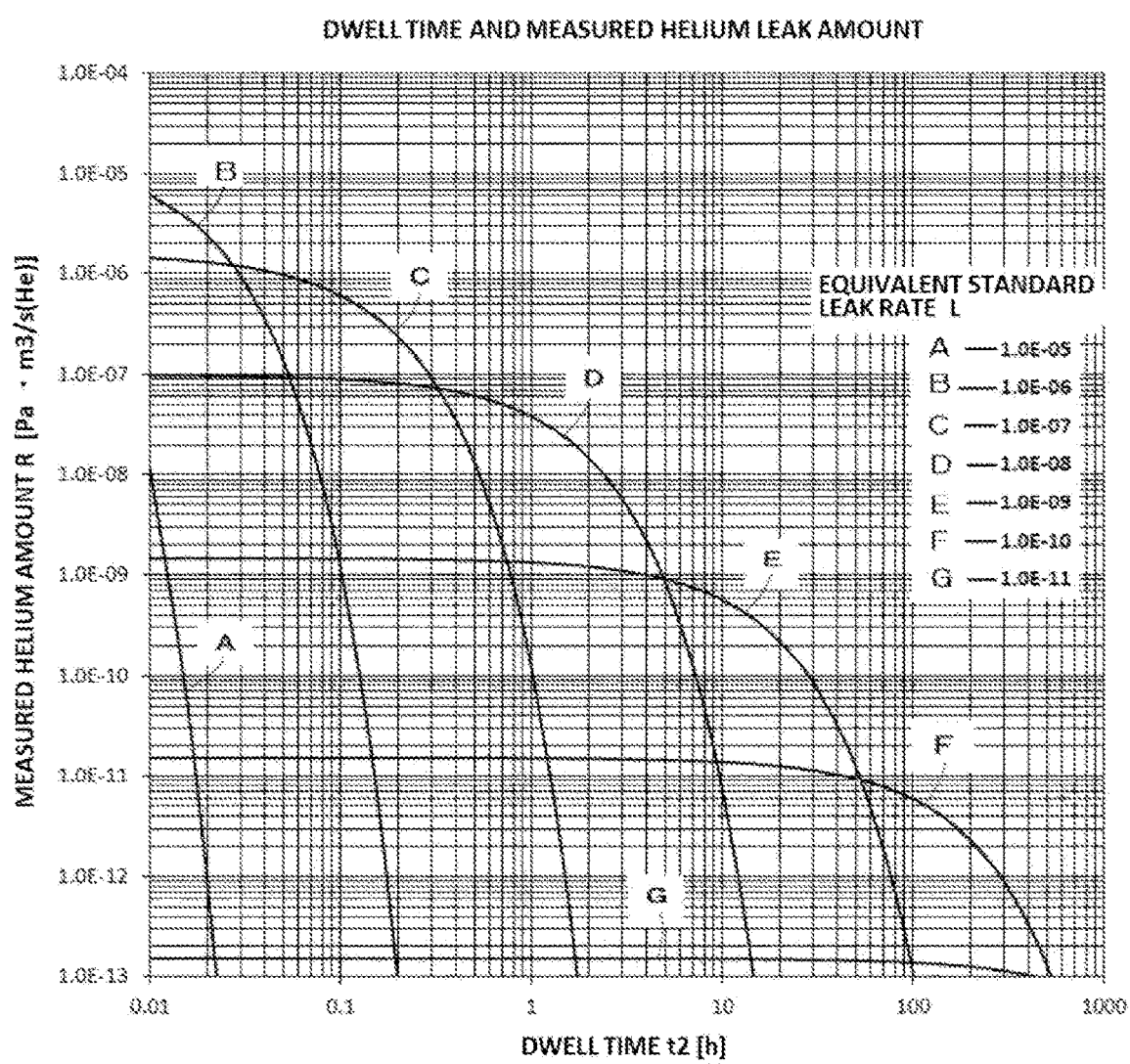
FIG. 6 is a graph illustrating changes of the helium leak amount over time for a test piece having an internal volume of 1 mm$^3$.
Figure 7:
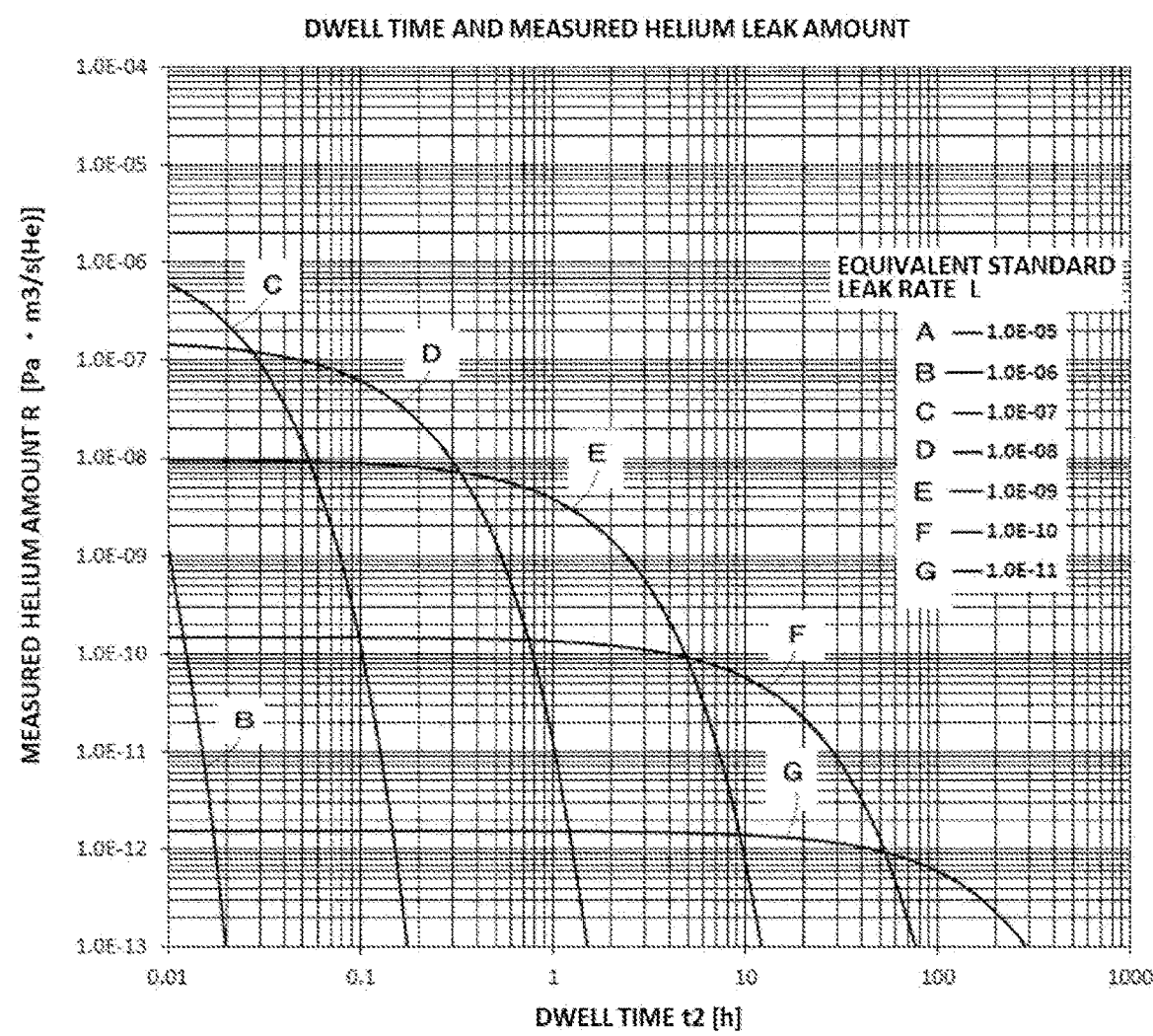
FIG. 7 is a graph illustrating changes of the helium leak amount over time for a test piece having an internal volume of 0.1 mm$^3$.

FIG. 6 shows relationships between the measured helium amount R and the dwell time t2 which are predicted with the leak amount of helium being divided into seven stages from A to G, where the bombing pressure P is 500 kPaG and the bombing time t1 is 1 hour, for the test piece having a test piece internal volume V of 1.0 mm³. In this figure, the leak amounts A to G are represented by equivalent standard leak rates L (Pa·m³/s) converted as described above. FIG. 7 shows relationships between the measured helium amount R and the dwell time t2 which are predicted with the leak amounts being divided into seven stages from A to G and converted into equivalent standard leak rates L (Pa·m³/s), under the same bombing pressure P and bombing time t1 as in FIG. 6, for the test piece having a test piece internal volume V of 0.1 mm³.

As described above in relation to the prior art, the relational expression (1) between the helium leak rate and the equivalent standard leak rate is defined in Annex D of JIS C 60068-2-17:2001. The similar relational expressions (2) and (3) are also defined in Annex 7 of JIS Z2331: 2006, and MIL-STD-883 METHOD 1014.15, 2.1.2.3, respectively. Using these expressions, and substituting numerical values of the test piece internal volume V, the bombing pressure P, the bombing time t1 etc. while, when the helium leak amount is taken as, for example, 1.0E-5 in equivalent standard leak rate (in the case of the leak amount A in FIGS. 6 and 7), increasing the dwell time t2 by 0.01 h, the helium leak amount of can be graphically shown as in FIGS. 6 and 7, by plotting the measured helium amounts R as calculated for the above values.

From FIGS. 6 and 7, it can be seen that the smaller the equivalent standard leak rate L (helium leak amount), the smaller the measured amount R of helium, and therefore time for helium to escape from the test piece increases and the dwell time t2 for which helium is detectable also increases. Further, FIG. 7 does not show the measurement result of the leak amount A in which the equivalent standard leak rate L is the largest. This suggests that in the case of the leak amount A, a measurable amount of helium is released from the test piece before the measurement of the helium amount (the minimum dwell time t2=0.01 h) starts.

In this manner, when the test piece internal volume, the bombing pressure and the bombing time are determined, it is possible to predict the relationship between the measured helium amount R and the dwell time t2. Therefore, it becomes easier to manage the dwell time in the helium leak test. Moreover, by converting changes concerning the helium leak amount into equivalent standard leak rates and representing as such, test results obtained from a plurality of helium leak tests performed under different test conditions (test gas type, applied pressure, test temperature, test time etc.) can be equivalently compared and evaluated on the same basis and scale. Furthermore, as will be described later, in the combined use of the helium leak test and the air leak test, it becomes possible to estimate an allowed dwell time as measurable by the helium leak test, without creating a dead zone between detectable leak regions in these tests.

Next, in step S05, the simulation processing part 22 converts the differential pressure value to be obtained when the test air pressure determined in step S03 is applied in an air leak test by the air leak testing unit 11, into an equivalent standard leak rate L, as described below. Specifically, where the differential pressure between the test piece and the master is ΔP, the atmospheric pressure is P0, the test piece internal volume is VW, and the time required for the measurement is t, the air leak amount Q leaked from the test piece to the atmosphere under the test air pressure can be expressed by the following equation.

$$Q = \Delta P/(P0 \cdot t) \times VW$$

From this relational expression, the differential pressure value is converted into an air leak amount when the test air pressure is applied.

From the obtained amount of air leak, the size (dimension) of the leak hole is determined as an assumed value corresponding to the size of the test piece. The size of the leak hole can be expressed, for example, by the hole diameter. Based on the hole diameter of the leak hole, the air leak amount Q obtained by the above relational expression is converted into an equivalent standard leak rate. In this manner, before the air leak test is actually performed on the test piece by the air leak testing unit 11, the differential pressure between the test piece and the master is obtained by the simulation, and the differential pressure is converted into an equivalent standard leak rate, and can be represented on a graph having the equivalent standard leak rate as the horizontal axis (or the vertical axis) as a differential pressure conversion value.

Figure 8:
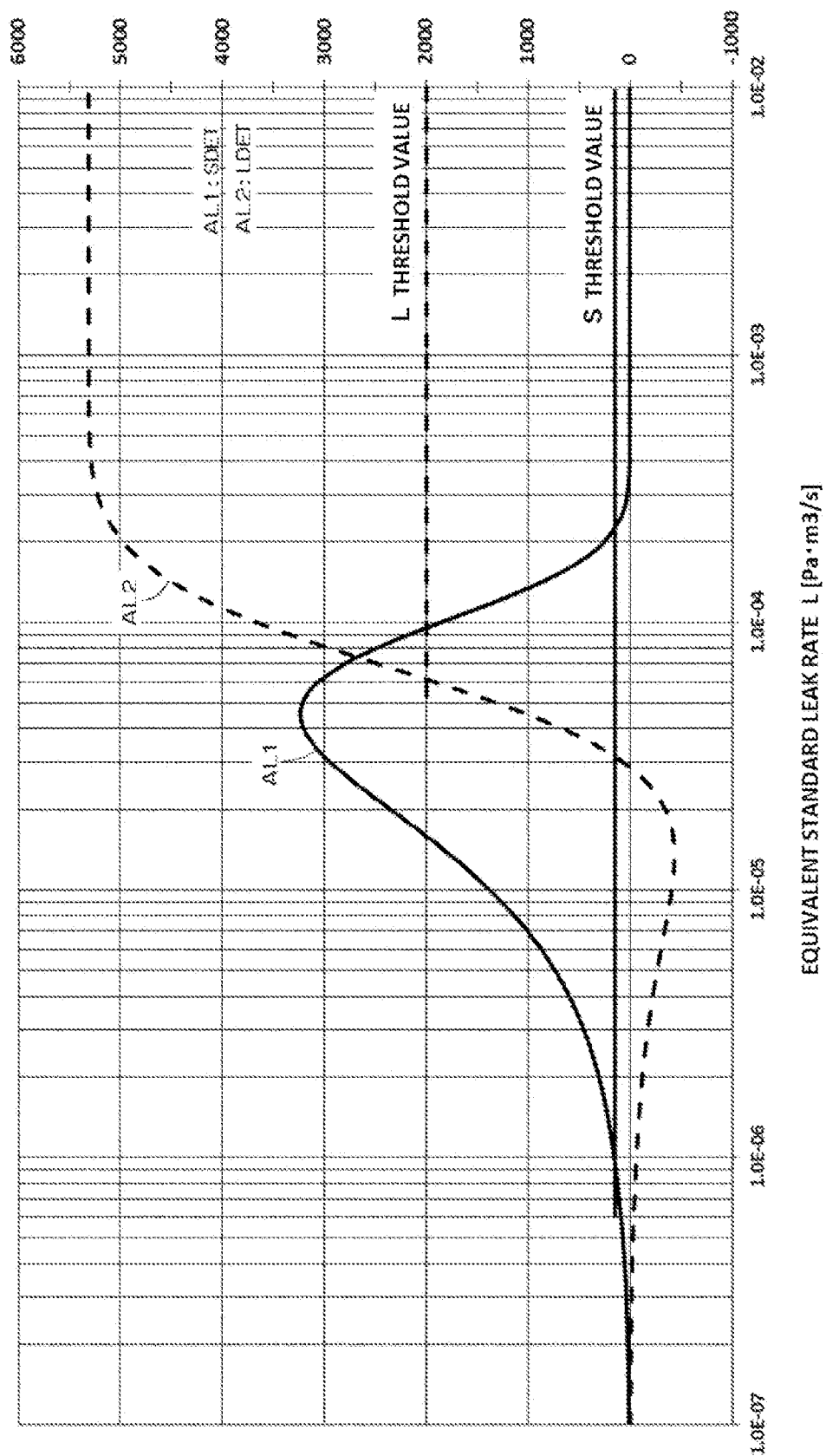
FIG. 8 is a graph illustrating a relationship between the differential pressure value obtained by a simulation of the air leak test and the equivalent standard leak rate.

FIG. 8 is a graph showing a differential pressure conversion value converted into the equivalent standard leak rate by the above-described simulation. In FIG. 8, the curve AL1 indicated by the solid line indicates a case of small leak in the gross leak region where the hole diameter of the leak hole is relatively small, and the curve AL2 indicated by the broken line indicates a case of large leak with a relatively large hole diameter of the leak hole. For example, in the curve AL1 indicated by the solid line, a range in which the differential pressure exceeds 150 Pa can be judged as defective. Further, in the curve AL2 indicated by the broken line, a range in which the differential pressure exceeds 2000 Pa can be judged as defective.

Further, in step S06, the simulation processing part 22 predicts the helium leak amount to be obtained when the helium leak testing unit 12 performs the helium leak test according to the helium bombing condition determined in step S04, and converts the helium leak amount into an equivalent standard leak rate L as described below. As described above, the relational expression (1) between the helium leak rate and the equivalent standard leak rate is defined in Annex D of JIS C 60068-2-17:2001. The similar relational expressions (2) and (3) are also defined in Annex 7 of JIS Z2331: 2006, and MIL-STD-883 METHOD 1014.15, 2.1.2.3.

The test piece internal volume obtained in step S01, the bombing pressure and the bombing time determined in step S04, the atmospheric pressure, the mass of air, the mass of helium gas, and the time from when the test piece is taken out from the bombing tank 73 until the measurement of the helium leak amount is completed are substituted into either of these relational expressions. Furthermore, the equivalent standard leak rate and/or the dwell time are set appropriately, in consideration of the conditions for the test piece itself (structure, configuration, material, test piece internal volume etc.), the actual use conditions for the test piece, the test conditions for the helium leak test etc., and a helium leak amount expected to be obtained in that case is calculated.

The setting of the equivalent standard leak rate and the dwell time can be performed by the simulation processing part 22, based on data stored in the control device 2 in advance, or is performed by the operator directly inputting from the input unit, or the simulation processing part 22 correcting or adjusting the set value. In this manner, the helium leak amount predicted by the simulation is obtained, before the helium leak test is actually performed on the test piece by the helium leak testing unit 12, and the helium leak amount can be converted into an equivalent standard leak rate and as a helium leak amount conversion value, to be represented on a graph with the equivalent standard leak rate as the horizontal axis (or the vertical axis).

Figure 9:
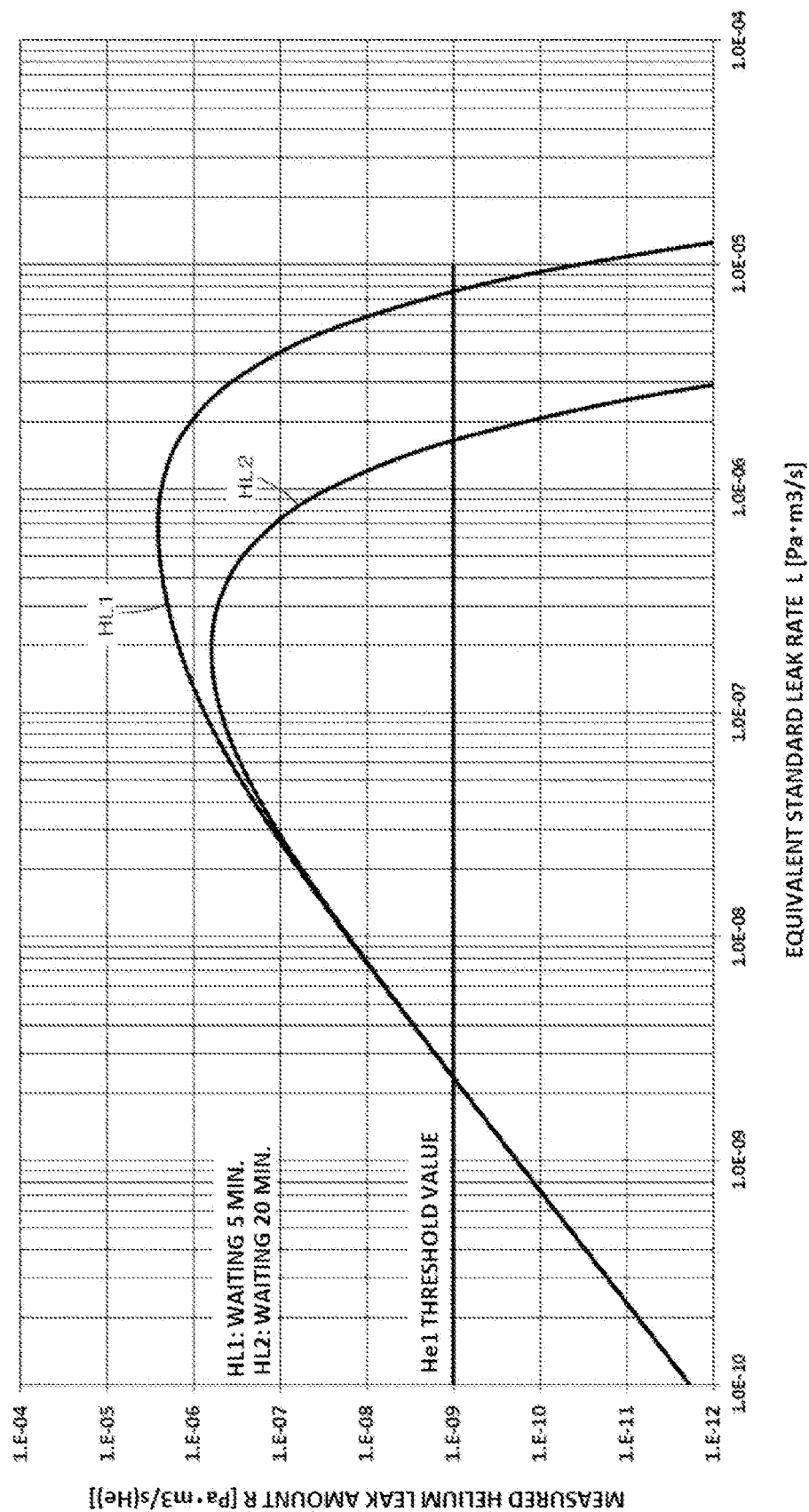
FIG. 9 is a graph illustrating a relationship between the helium leak amount obtained by a simulation of the helium leak test and the equivalent standard leak rate.

FIG. 9 is a graph showing a helium leak amount conversion value converted into the equivalent standard leak rate by the above-described simulation. In FIG. 9, the curve HL1 shows a case where the dwell time after bombing is set to be short (5 minutes), and the curve HL2 shows a case where the dwell time after bombing is set to be long (20 minutes). In FIG. 9, for example, a range in which the helium leak amount exceeds $1.0E^{-9}$ Pa·m$^3$/s can be determined to be defective.

Next, the test condition determining part 23 integrates the graph 1 obtained in step S05 and the graph 2 obtained in step S06 to be displayed on the same graph with the equivalent standard leak rate on the horizontal axis (or the vertical axis) (step S07). The integrated data on the graph 1 and the graph 2 is output to the L conversion result display part 32 of the display unit 3 and displayed as graph 3 on the display screen. The integrated data can also be output to the external device and/or a printer or the like connected to the control device 2.

Figure 10:
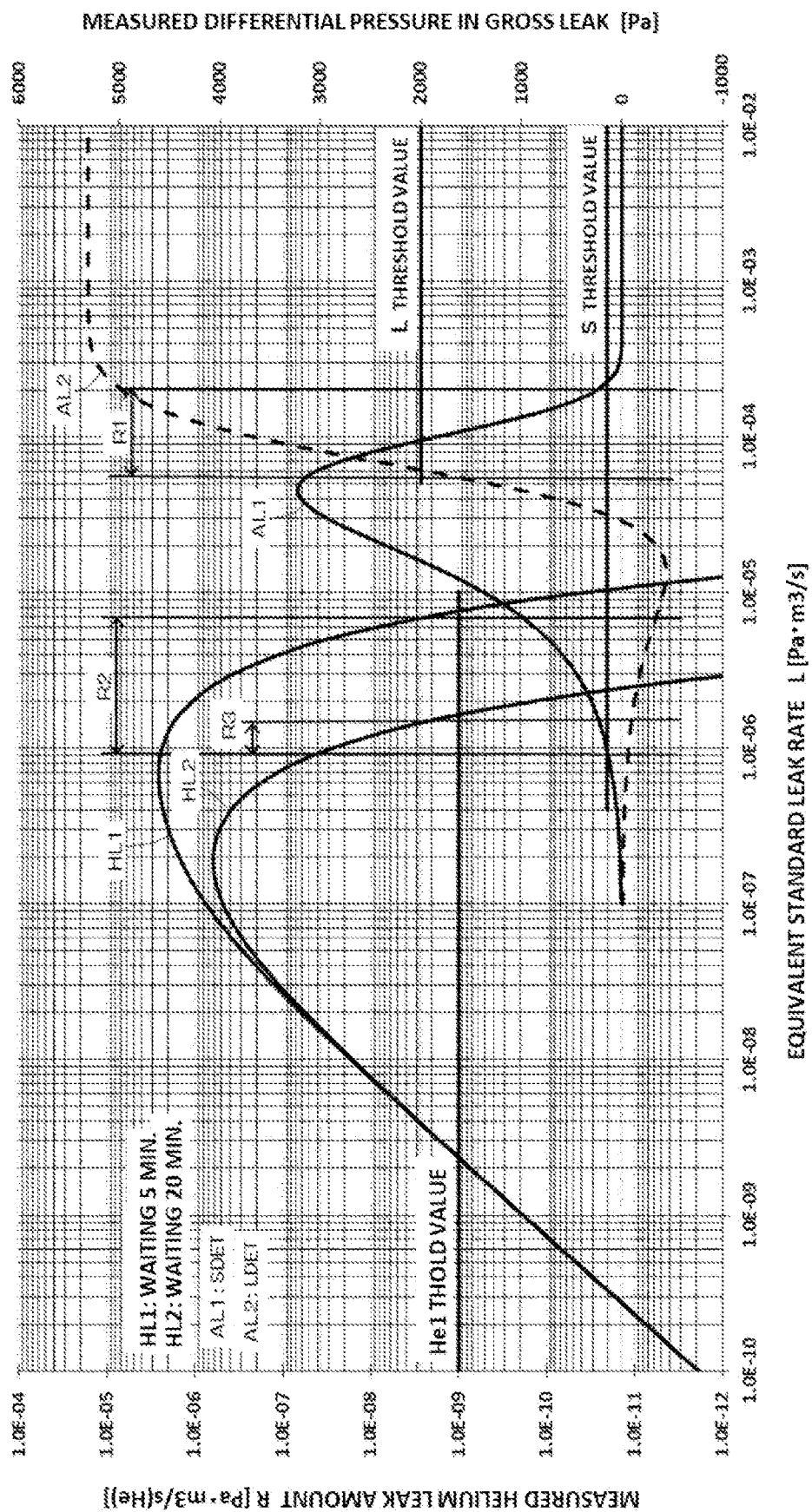
FIG. 10 is a graph integrating the graph of FIG. 8 and the graph of FIG. 9.

The graph of FIG. 10 displays the graph of FIG. 8 and the graph of FIG. 9 on the same graph with the equivalent standard leak rate as the horizontal axis. From this graph, the operator can clearly check the detectable range in the differential pressure based air leak test and the helium leak test on the test piece at a glance. Thus, the operator can easily determine the suitability of the test conditions for the air leak test and/or the helium leak test determined as described above. Further, the operator can determine a threshold value for determining the quality of the test piece in the differential pressure based air leak test and/or the helium leak test from the graph of FIG. 10. The operator can input the determined threshold value to the control device 2.

In FIG. 10, the curve AL1 indicated by the solid line and the curve AL2 indicated by the broken line in the air leak test overlap in the range R1 from $6.5E^{-5}$ Pa·m$^3$/s to $2.1E^{-4}$ Pa·m$^3$/s on the horizontal axis of the equivalent standard leak rate. Therefore, by setting the air leak test conditions such that the curve AL1 and the curve AL2 are formed, it can be evaluated that measurement is possible without causing a dead zone between large leaks and small leaks in the gross leak test region.

Further, the curve AL1 in the air leak test and the curve HL1 in the helium leak test sufficiently overlap in the range R2 from $1.0E^{-6}$ Pa·m$^3$/s to $7.5E^{-6}$ Pa·m$^3$/s on the horizontal axis of the equivalent standard leak rate. Therefore, by setting the test conditions for the air leak test and the helium leak test such that the curve AL1 and the curve HL1 are formed, it can be evaluated that measurement is possible without causing a dead zone between the two test regions.

On the other hand, the curve AL1 in the air leak test and the curve HL2 in the helium leak test overlap only in a very narrow range R3 from $1.0E^{-6}$ Pa·m$^3$/s to $1.5E^{-6}$ Pa·m$^3$/s on the horizontal axis of the equivalent standard leak rate. From this, by setting the test conditions for the air leak test and the helium leak test such that the curve AL1 and the curve HL2 are formed, it can be evaluated that there is a risk of causing a dead zone between the test regions when the air leak test and the helium leak test are actually performed on the test piece.

The test condition determining part 23 determines, from the graphical data integrated as shown in FIG. 10, whether or not there are sufficient overlapping regions and there is a risk of causing a dead zone, on the equivalent standard leak rate axis, between the test ranges of the air leak test and the helium leak test, that is, the ranges of leak regions measurable in both leak tests, and/or between the test ranges of air leak tests and/or helium leak tests with different test conditions (step S09). The determination result can be output to the L conversion result display part 32 of the display unit 3 and/or can be output to the external device, a printer, or the like.

Further, when the test condition determining part 23 determines that there are sufficient overlapping regions and there is no risk of causing a dead zone, the test conditions for the air leak test and the helium leak test determined in steps S03 and S04 are appropriate as described above are transmitted to the leak test control part 21 and stored therein. As a result, the leak test control part 21 can control the air leak testing unit 11 and the helium leak testing unit 12 of the inspection device main body 1 such that the air leak test and helium leak test are actually performed on the test piece, without any risk of causing a dead zone.

In this case, the test condition determining part 23 can determine a differential pressure value and/or a helium leak amount which is considered to be preferable for a threshold value for determining the quality of the test piece in the differential pressure based air leak test and/or the helium leak test, from the data on the graph illustrated in FIG. 10. The determination of the threshold value is performed, for example, based on information input by the operator in advance to the control device 2 or data stored in the storage device. The threshold value determined by the test condition determining part 23 in this manner is preferably displayed on the display screen of the display unit 3, for example, and transmitted to the leak test control part 21 after obtaining approval of the operator.

On the contrary, when the test condition determining part 23 determines that there is no sufficient overlapping region and there is a risk of causing a dead zone, a warning that the test conditions for the air leak test and/or the helium leak test determined in step S03 and/or S04 are inappropriate can be output to the L conversion result display part 32 of the display unit 3 or the external device or the printer. In this way, it is possible to prevent an operator from erroneously adopting unfavorable test conditions.

The operator who receives this warning can change the test conditions for the air leak test and/or the helium leak test and cause the control device 2 to execute the above-described leak test condition design method again. Further, the test condition determining part 23 is configured to cause step S02 and the subsequent processes of obtaining the remaining volume of the test piece capsule 52 of the leak test condition design method to be automatically and repeatedly executed, until a determination result is obtained that there are sufficient overlapping regions and there is no risk of causing a dead zone, for the same test piece.

Further, considering that the detection sensitivity of the air leak test is improved by reducing the remaining volume of the test piece capsule 52, reviewing the remaining volume of the test piece capsule 52 during the repeating processes described above is effective in eliminating the dead zone between the test ranges of the air leak test and the helium leak test to implement overlapping regions. Furthermore, the reviewing of the remaining volume is advantageous because it can be used to review the shape and design values of the test piece capsule 52 itself.

Figure 11:
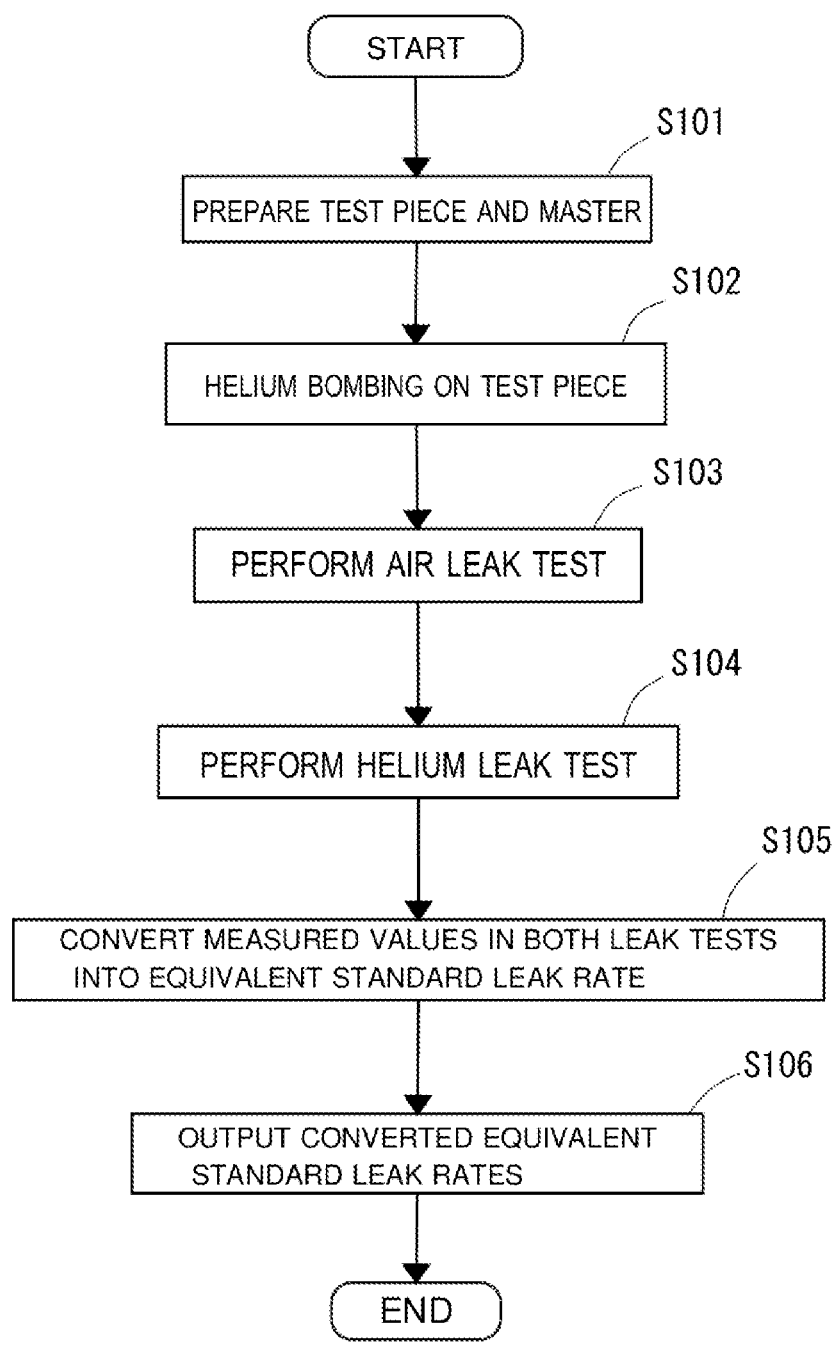
FIG. 11 is a flowchart of the leak testing method according to the present embodiment.

According to the leak testing method of the present embodiment, the air leak test and the helium leak test are executed based on the test conditions determined to be suitable by the above-described leak test condition design method. The flowchart of FIG. 11 shows suitable embodiments of an air leak test and a helium leak test that are executed following the leak test condition design method of FIG. 4, by using the leak testing device 100 of FIG. 1.

First, the test piece and the master to be actually subjected to the leak test are prepared (step S101). Next, the test piece is loaded in the bombing tank 73, helium is supplied, and bombing is performed based on the bombing conditions determined in step S04 of FIG. 4 (step S102). After the set bombing time elapses, the test piece is taken out from the bombing tank 73 and conveyed to the air leak testing unit 11 to execute an air leak test (step S103).

The air leak test of the test piece is divided into "small leak" having a small leak amount and "large leak" having a large leak amount, and is performed in order. With the second on-off valves 55a and 55b closed, after the test piece and the master are loaded in the test piece capsule 52 and the master capsule 53 of the air leak testing unit 11, respectively, the leak test control part 21 applies the test air pressure determined in step S03 in FIG. 4 from the test pressure supply source 41 to the test piece-side branch passage 45a and the master-side branch passage 45b.

Next, the first on-off valves 51a and 51b are closed, and the differential pressure (small leak) generated between the closed circuit portion of the test piece-side branch passage 45a on the downstream side and the closed circuit portion of the master-side branch passage 45b is detected by the differential pressure sensor 58. Further, while the first on-off valves 51a and 51b are closed, the second on-off valves 55a and 55b are opened to allow the air in the closed circuit portions of the test piece-side and master-side branch passages 45a and 45b to be divided into pressure dividing tanks 56a and 56b, respectively, and the differential pressure sensor 58 detects the pressure difference (large leak) after pressure division. After this, the air in the test piece-side and master-side branch passages 45a and 45b is discharged, the test piece is taken out from the test piece capsule 52 and is carried out to the helium leak testing unit 12, and the process proceeds to the helium leak test.

When the differential pressure of the detected small leak or large leak is within a range of a threshold value set in advance, the air leak testing unit 11 determines that the test piece is a good product, outputs a signal to the display unit 3, and displays that the test piece is a good product on the display screen of the test result display part 31. When the differential pressure of the detected small leak or large leak exceeds the threshold value, the air leak testing unit 11 determines that the test piece is a defective product having a gross leak, outputs a signal to the display unit 3, and displays that the test piece is a defective product on the display screen of the test result display part 31.

Next, in step S104, the helium leak testing unit 12 executes a helium leak test. The test piece carried out from the air leak testing unit 11 to the helium leak testing unit 12 is transferred to the examination capsule 81, and the amount of helium leak leaked from the test piece is detected by the helium leak detector 82.

At this time, the helium leak testing unit 12 can count the time until the helium leak test is completed by moving the test piece from the bombing tank 73 to the examination capsule 81. Then, from the viewpoint of management of the dwell time, it is preferable to output to the display unit 3 and display on the screen whether or not the counted time is within the preset dwell time.

When the detected helium leak amount is within a range of a threshold value set in advance, the helium leak testing unit 12 determines that the test piece is a good product, outputs a signal to the display unit 3, and displays that the test piece is a good product on the display screen of the test result display part 31. When the detected helium leak amount exceeds the threshold value, the helium leak testing unit 12 determines that the test piece is a defective product having a minute leak, outputs a signal to the display unit 3, and displays that the test piece is a defective product on the display screen of the test result display part 31.

Further, even when the counting time from moving the test piece from the bombing tank 73 to the examination capsule 81 to completing the helium leak test exceeds the preset dwell time, the helium leak testing unit 12 can determine that the test piece is a defective product, output that fact to the display unit 3, and display it on the screen together with the count time. This is because the dwell time is set as an dwell time for guarantee of the leak region in which inspection is possible in the helium leak test in step S104 described above, based on the prediction results illustrated in FIGS. 6 and 7, and there is a risk that the leak region cannot be guaranteed, when the dwell time is elapsed.

This will be specifically described with reference to the graph of FIG. 10 below. In FIG. 10, the curve HL1 of the helium leak test is a simulation result when the measurement is performed 5 minutes after the test piece is taken out from the bombing tank 73, is closer to the curve AL1 side of the air leak test, as compared with the curve HL2 that is a simulation result when the measurement is performed 20 minutes after, and has a region sufficiently overlapping the curve AL1. On the other hand, since the region of the curve HL2 that overlaps the curve AL1 is narrow, the allowable dwell time in the helium leak test can be set to 5 minutes in consideration of the safety ratio. When the dwell time exceeds 5 minutes, the graph of the helium measurement flow rate in FIG. 10 shifts from the curve HL1 to the curve HL2 side in a direction away from the curve AL1, and the overlapping region with the curve AL1 becomes narrower, so that there may be cases where it is not possible to guarantee.

The detection results of the air leak test and the helium leak test described above are output to the control device 2 from the air leak testing unit 11 and the helium leak testing unit 12, respectively. The leak test control part 21 of the control device 2 converts the measured values of the differential pressure and the helium leak amount obtained from the air leak testing unit 11 and the helium leak testing unit 12 into an equivalent standard leak rate (step S105), and outputs the equivalent standard leak rate to the display unit 3 to be displayed on a screen (step S106).

Figure 4:
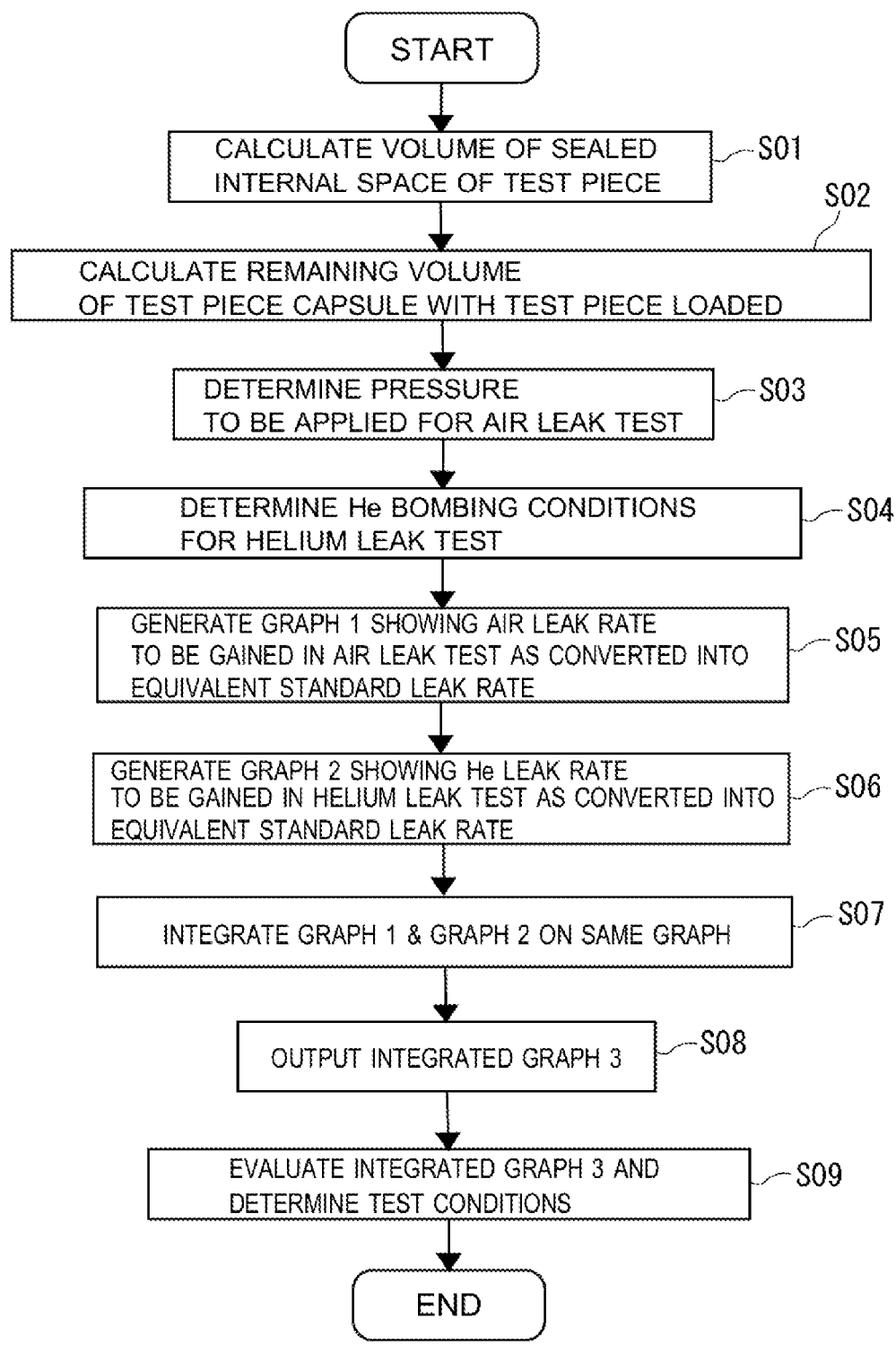
FIG. 4 is a flowchart of a leak test condition design method according to the present embodiment.

When the display unit 3 causes the L conversion result display part 32 to display the equivalent standard leak rate conversion value of the measured value received from the leak test control part 21 superimposed on the integrated graph 3 generated in step S07 of FIG. 4, it is possible to easily visually verify whether or not the measurement results of the air leak test and the helium leak test are within the test range assumed by the leak test condition design method described above. The equivalent standard leak rate conversion value of the measured value in step S105 can also be output to the external device or the printer.

In the present embodiment, as described above in relation to FIG. 11, a leak testing method in which helium bombing is first performed on the test piece, and the air leak test and the helium leak test are continuously performed within a set dwell time is suitable for, in particular, a case where both leak tests are automatically and continuously performed by one automatic inspection device. In another embodiment, the air leak test and the helium leak test can be performed by separate inspection devices. In this case, the helium leak test is performed by first performing an air leak test with the air leak testing device, then conveying the test piece to the helium leak testing device, moving the test piece to the bombing tank 73, and performing helium bombing.

Hitherto, the present invention has been described in detail in relation to suitable embodiments thereof. However, the present invention is not limited to the above embodiments, and can be carried out with various modifications or changes within the technical scope of the present invention. For example, in the leak testing method illustrated in FIG. 11, the order of executing the air leak test (step S103) and the helium leak test (step S104) may be reversed.

DESCRIPTION OF REFERENCE NUMERALS

1 Inspection device main body
2 Control device
3 Display unit
11 Air leak testing unit
12 Helium leak testing unit
21 Leak test control part
22 Simulation processing part
23 Test condition judging part
31 Test result display part
32 Equivalent standard leak rate conversion result display part (L conversion result display part)
100 Leak testing device

The invention claimed is:

1. A leak test condition design method comprising:
obtaining a volume of an sealed internal space of a test piece to be inspected;
obtaining a remaining volume of an internal space of a sealed container for the test piece when the test piece is loaded for a differential pressure based air leak test;
determining a test air pressure to be applied into the sealed container for the test piece with the test piece loaded and a sealed container for a master with a master loaded in the differential pressure based air leak test;
determining conditions of a bombing process for filling a filling chamber with the test piece loaded with helium gas in a helium leak test;
simulating the differential pressure based air leak test under the obtained volume of the sealed internal space of the test piece, the obtained remaining volume of the internal space of the sealed container for the test piece, and the determined test air pressure to obtain a differential pressure value between the test piece and the master, and converting the obtained differential pressure value into an equivalent standard leak rate to derive a differential pressure conversion value; and
simulating the helium leak test under the determined conditions of the bombing process to obtain a helium leak rate of the test piece and converting the obtained helium leak rate into an equivalent standard leak rate to derive a helium leak rate conversion value, wherein
the differential pressure conversion value and the helium leak rate conversion value are generated to be displayed on a same graph with the equivalent standard leak rate as a horizontal axis or a vertical axis.

2. The leak test condition design method according to claim 1, further comprising:
displaying the differential pressure conversion value and the helium leak rate conversion value on the same graph with the equivalent standard leak rate as the horizontal axis or the vertical axis.

3. The leak test condition design method according to claim 1, further comprising:
judging whether or not the differential pressure conversion value and the helium leak rate conversion value displayed on the same graph with the equivalent standard leak rate as the horizontal axis or the vertical axis have a region or regions partially overlapping each other with respect to the equivalent standard leak rate.

4. The leak test condition design method according to claim 3, further comprising:
repeating the steps of the obtaining the remaining volume of the internal space of the sealed container for the test piece and thereafter, in case the differential pressure conversion value and the helium leak rate conversion value are judged not having a partially overlapping region with respect to the equivalent standard leak rate.

5. The leak test condition design method according to claim 1, wherein
the determined test air pressure and/or the determined conditions of the bombing process are judged as appropriate or not, depending on whether or not the differential pressure conversion value and the helium leak rate conversion value generated to be displayed on the same graph with the equivalent standard leak rate as the horizontal axis or the vertical axis have a region or regions partially overlapping each other with respect to the equivalent standard leak rate.

6. The leak test condition design method according to claim 1, wherein
in the step of converting the obtained differential pressure value to derive the differential pressure conversion value, the obtained differential pressure value between the test piece and the master is converted into an air leak amount for the determined test air pressure, and transforming the converted air leak amount into dimensions of a leak hole of the test piece, so that the differential pressure value is converted into the equivalent standard leak rate based on the transformed dimensions of the leak hole.

7. The leak test condition design method according to claim 6, wherein
the dimensions of the leak hole are a diameter and a length in a gas flow direction of the leak hole.

8. The leak test condition design method according to claim 1, wherein
in the step of converting the obtained helium leak rate to derive a helium leak rate conversion value, the obtained helium leak rate is converted into an equivalent standard leak rate according to a relational expression between the helium leak rate and the equivalent standard leak rate based on Annex D of JIS C60068-2-17: 2001.

9. A leak testing method comprising:
performing the leak test condition design method according to claim 1 on a test piece to be inspected;
performing a differential pressure based air leak test on the test piece; and
performing a helium leak test through a helium bombing process on the test piece, wherein
the differential pressure based air leak test and/or the helium leak test are performed based on the test air pressure and/or the conditions of the bombing process, said test air pressure and the conditions of the bombing process being determined in the leak test condition design method so that the differential pressure conversion value and the helium leak rate conversion value have a region or regions partially overlapping each other with respect to an equivalent standard leak rate, when these conversion values are displayed on a same graph with the equivalent standard leak rate as a horizontal axis or a vertical axis.

10. A leak test condition design device comprising:
a computing part configured to obtain a volume of an sealed internal space of a test piece to be inspected, and to obtain a remaining volume of an internal space of a sealed container for the test piece when the test piece is loaded for a differential pressure based air leak test;
a first test condition setting part configured to determine a test air pressure to be applied into the sealed container for the test piece with the test piece loaded and a sealed container for a master with a master loaded in the differential pressure based air leak test;
a second test condition setting part configured to determine conditions of a bombing process for filling a filling chamber with the test piece loaded with helium gas in a helium leak test;
a first simulation processing part configured to simulate the differential pressure based air leak test under the obtained volume of the sealed internal space of the test piece, the obtained remaining volume of the internal space of the sealed container for the test piece, and the determined test air pressure to obtain a differential pressure value between the test piece and the master, and also configured to convert the obtained differential pressure value into an equivalent standard leak rate to derive a differential pressure conversion value;
a second simulation processing part configured to simulate the helium leak test under the determined conditions of the bombing process to obtain a helium leak rate of the test piece, and also configured to convert the obtained helium leak rate into an equivalent standard leak rate to derive a helium leak rate conversion value; and
a display unit configured to display the differential pressure conversion value obtained from the first simulation processing part and the helium leak rate conversion value obtained from the second simulation processing part, on a same graph with the equivalent standard leak rate as a horizontal axis or a vertical axis.

11. The leak test condition design device according to claim 10, further comprising:
a judging part configured to judge whether the differential pressure conversion value and the helium leak rate conversion value have a region or regions partially overlapping each other with respect to the equivalent standard leak rate or not, when these conversion values are displayed on the same graph.

12. The leak test condition design device according to claim 10, further comprising:
a control part configured to control the computing part, the first test condition setting part, the second test condition setting part, the first simulation processing part, the second simulation processing part and the display unit, so that a series of operations including obtaining the remaining volume of the internal space of the sealed container for the test piece by the computing part, determining the test air pressure by the first test condition setting part, determining the conditions of the bombing process by the second test condition setting part, deriving the differential pressure conversion value by the first simulation processing part, deriving the helium leak rate conversion value by the second simulation processing part, and displaying the differential pressure conversion value and the helium leak rate conversion value on the same graph by the display unit are performed, in case the judging part judges that the differential pressure conversion value and the helium leak rate conversion value do not have a partially overlapping region with respect to the equivalent standard leak rate when displayed on the same graph.

13. The leak test condition design device according to claim 10, wherein
the first simulation processing part converts the differential pressure value between the test piece and the master to be obtained in the differential pressure based air leak test, into an air leak amount for the determined test air pressure, and transforms the converted air leak amount into dimensions of a leak hole of the test piece, to convert the differential pressure value into the equivalent standard leak rate based on the transformed dimensions of the leak hole, so as to derive the differential pressure conversion value.

14. The leak test condition design device according to claim 13, wherein
the dimensions of the leak hole are a diameter and a length in a gas flow direction of the leak hole.

15. The leak test condition design device according to claim 10, wherein
the second simulation processing part converts the helium leak rate to be obtained in the helium leak test, into an equivalent standard leak rate according to a relational expression between the helium leak rate and the equivalent standard leak rate based on Annex D of JIS C60068-2-17: 2001, so as to derive a helium leak rate conversion value.

16. A leak testing device comprising:
the leak test condition design device according to claim 10;
an air leak testing unit to execute a differential pressure based air leak test on a test piece to be inspected, based on the test air pressure determined by the first test condition setting part of the leak test condition design device; and
a helium leak testing unit to execute a helium leak test through a helium bombing process on the test piece to be inspected, based on the conditions of the bombing process determined by the second test condition setting part of the leak test condition design device.

* * * * *